US010433670B2

(12) United States Patent
Flick

(10) Patent No.: US 10,433,670 B2
(45) Date of Patent: Oct. 8, 2019

(54) CONTAINER AND CODE OF SYSTEM FOR PREPARING A BEVERAGE OR FOODSTUFF

(71) Applicant: Nestec S.A., Vevey (CH)

(72) Inventor: Jean-Marc Flick, Pomy (CH)

(73) Assignee: Societe des Produits Nestle S.A., Vevey (CH)

( * ) Notice: Subject to any disclaimer, the term of this patent is extended or adjusted under 35 U.S.C. 154(b) by 220 days.

(21) Appl. No.: 15/128,645

(22) PCT Filed: May 13, 2015

(86) PCT No.: PCT/EP2015/060555
§ 371 (c)(1),
(2) Date: Sep. 23, 2016

(87) PCT Pub. No.: WO2015/173285
PCT Pub. Date: Nov. 19, 2015

(65) Prior Publication Data
US 2018/0177331 A1 Jun. 28, 2018

(30) Foreign Application Priority Data

May 13, 2014 (EP) .................................. 14168066
Jan. 21, 2015 (EP) .................................. 15151954

(51) Int. Cl.
G06K 19/06 (2006.01)
A47J 31/44 (2006.01)
(Continued)

(52) U.S. Cl.
CPC ......... A47J 31/4492 (2013.01); A47J 31/407 (2013.01); B65D 85/8043 (2013.01);
(Continued)

(58) Field of Classification Search
CPC . A47J 31/4492; A47J 31/407; B65D 85/8043; B65D 2203/12; G06K 7/1413;
(Continued)

(56) References Cited

U.S. PATENT DOCUMENTS 4,567,361 A 1/1986 Rosenthal
6,808,117 B2 10/2004 Han
(Continued)

FOREIGN PATENT DOCUMENTS

DE 1774490 A1 1/1972
EP 2345351 A1 7/2011
(Continued)

OTHER PUBLICATIONS

Office Action dated Dec. 29, 2016 in U.S. Appl. No. 15/124,521.
(Continued)

Primary Examiner — Karl D Frech
(74) Attorney, Agent, or Firm — K&L Gates LLP

(57) ABSTRACT

A container for a foodstuff or beverage preparation machine, the container for containing beverage or foodstuff preparation material and comprising a code encoding preparation information, the code comprising: a data sequence having a plurality of marker locations, whereby said marker locations either comprise or do not comprise a marker as a variable to at least partially encode the preparation information therein, with adjacent marker locations separated by a distance of $\Delta x$; at least one locator marker to enable location of the data sequence of the code, the locator marker having a read distance X2, which is distinct from a read distance X1 of the data markers to enable a locator marker to be identified.

18 Claims, 9 Drawing Sheets

(51) Int. Cl.
*A47J 31/40* (2006.01)
*B65D 85/804* (2006.01)
*G06K 7/14* (2006.01)

(52) U.S. Cl.
CPC ..... *G06K 7/1413* (2013.01); *G06K 19/06018* (2013.01); *G06K 19/06028* (2013.01); *G06K 19/06168* (2013.01); *B65D 2203/12* (2013.01)

(58) Field of Classification Search
CPC ....... G06K 19/06018; G06K 19/06028; G06K 19/06168
USPC .......................................... 235/494, 383, 385
See application file for complete search history.

(56) References Cited

U.S. PATENT DOCUMENTS

| | | | |
|---|---|---|---|
| 6,866,199 | B1 | 3/2005 | Keech |
| 2003/0116629 | A1 | 6/2003 | Suave |
| 2010/0078480 | A1 | 4/2010 | Aker |
| 2010/0252632 | A1 | 10/2010 | Sowers et al. |
| 2011/0303746 | A1* | 12/2011 | Learmonth ........ G01N 21/3563 235/380 |
| 2013/0014648 | A1* | 1/2013 | Rognon .............. A47J 31/3623 99/280 |
| 2014/0328983 | A1 | 11/2014 | Jarisch et al. |
| 2015/0339508 | A1* | 11/2015 | Hosokane ........ G06K 19/06037 235/462.09 |
| 2016/0042262 | A1* | 2/2016 | Tanaka ................. G06K 7/1417 235/494 |

FOREIGN PATENT DOCUMENTS

| | | |
|---|---|---|
| EP | 2594171 A1 | 5/2013 |
| WO | 2015173285 A1 | 11/2015 |
| WO | 2015173292 A1 | 11/2015 |

OTHER PUBLICATIONS

International Search Report, dated Aug. 10, 2015, in PCT/EP2015/060555, filed May 13, 2015.
Written Opinion of the International Searching Authority, dated Aug. 10, 2015, in PCT/EP2015/060555, filed May 13, 2015.
International Search Report, dated Jul. 31, 2015, in PCT/EP2015/060567, filed May 13, 2015.
Written Opinion of the International Searching Authority, dated Jul. 31, 2015, in PCT/EP2015/060567, filed May 13, 2015.
International Search Report, dated Jul. 29, 2015, in PCT/EP2015/060561, filed May 13, 2015.
Written Opinion of the International Searching Authority, dated Jul. 29, 2015, in PCT/EP2015/060561, filed May 13, 2015.
U.S. Appl. No. 15/122,576, Jean-Marc Flick, filed Aug. 30, 2016; Notice of Allowance dated Nov. 3, 2017.

* cited by examiner

CONTAINER AND CODE OF SYSTEM FOR PREPARING A BEVERAGE OR FOODSTUFF

CROSS REFERENCE TO RELATED APPLICATIONS/INCORPORATION BY REFERENCE STATEMENT

This application is a US national stage application filed under 35 USC § 371 of International Application No. PCT/EP2015/060555, filed May 13, 2015; which claims priority to Application No. EP 14168066.0, filed May 13, 2014, and Application No. EP 15151954.3, filed Jan. 21, 2015. The entire contents of the above-referenced application are hereby expressly incorporated herein by reference.

TECHNICAL FIELD

The presently disclosed and/or claimed inventive concept(s) relates to a system for the preparation of a beverage or foodstuff, the system comprising a preparation machine and a container to contain beverage or foodstuff material. More particularly the presently disclosed and/or claimed inventive concept(s) relates to a code arranged on the container that encodes preparation information used by said machine and to a method of processing to decode said information.

BACKGROUND

Increasingly preparation machines for the preparation of a beverage or foodstuff are configured to operate using a container that comprises a single-serving of a preparation material, e.g. coffee, tea, ice cream, yoghurt. The machine is generally configured for preparation by at least partially extracting an ingredient of the material from the container, e.g. by dissolution or brewing. Examples of such machines are provided in EP 2393404 A1, EP 2470053 A1, EP 2533672 A1, EP 2509473 A1, EP 2685874 A1. The machine may alternatively be configured for preparation by processing said material in the container, e.g. with the addition of fluid, such as milk or water, and the application of mixing thereto, such a machine is disclosed in PCT/EP13/072692.

The increased popularity of these machines may be partly attributed to enhanced user convenience compared to a conventional preparation machine, e.g. compared to a manually operated stove-top espresso maker or cafetiére (French press).

It may also be partly attributed to an enhanced preparation process, wherein preparation information specific to the container and/or preparation material therein is: encoded in a code on the container; read by the preparation machine; used by the machine to optimise the preparation process. In particular, the preparation information may comprise operational parameters of the machine, such as: fluid temperature; preparation duration; mixing conditions.

Accordingly, there is a need to code preparation information on the container. Various such codes have been developed, an example is provided in EP 2594171 A1, wherein a periphery of a flange of a capsule comprises a code arranged thereon. The code comprises a formation of rectilinear segments, each of a predetermined same size, each arranged next to each other, hence in a predetermined position. The segments are shaded or blank to encode the information. The segments extend circumferentially on the side of the capsule. The code consists of: a data sequence, which comprises a series of segments for providing the aforesaid preparation information; a start and a stop sequence comprising a unique string (typically 6) of shaded and blank segments to enable the location of the data sequence. Accordingly the code is processed to search for matches to said unique string to locate therefrom the data sequence, which is subsequently decoded. A drawback of the code is that notable processing is required to locate the start and stop sequence. Moreover the start and stop sequence occupy a relatively large amount of space on the capsule, which is both aesthetically displeasing and reduces the option to apply advertisement thereto. A further drawback is that the size of the code is fixed by predetermined bar positions/sizes. In this way it cannot be adapted in size for different encoding densities, i.e. to suit different geometry containers. A yet further drawback is that the data sequence requires notable processing to decode.

BRIEF DESCRIPTION OF THE DRAWINGS

For a better understanding of the presently disclosed and/or claimed inventive concept(s), and to show how embodiments of the same may be carried into effect, reference will now be made, by way of example, to the accompanying diagrammatic drawings in which:

DETAILED DESCRIPTION

Figure 1A:
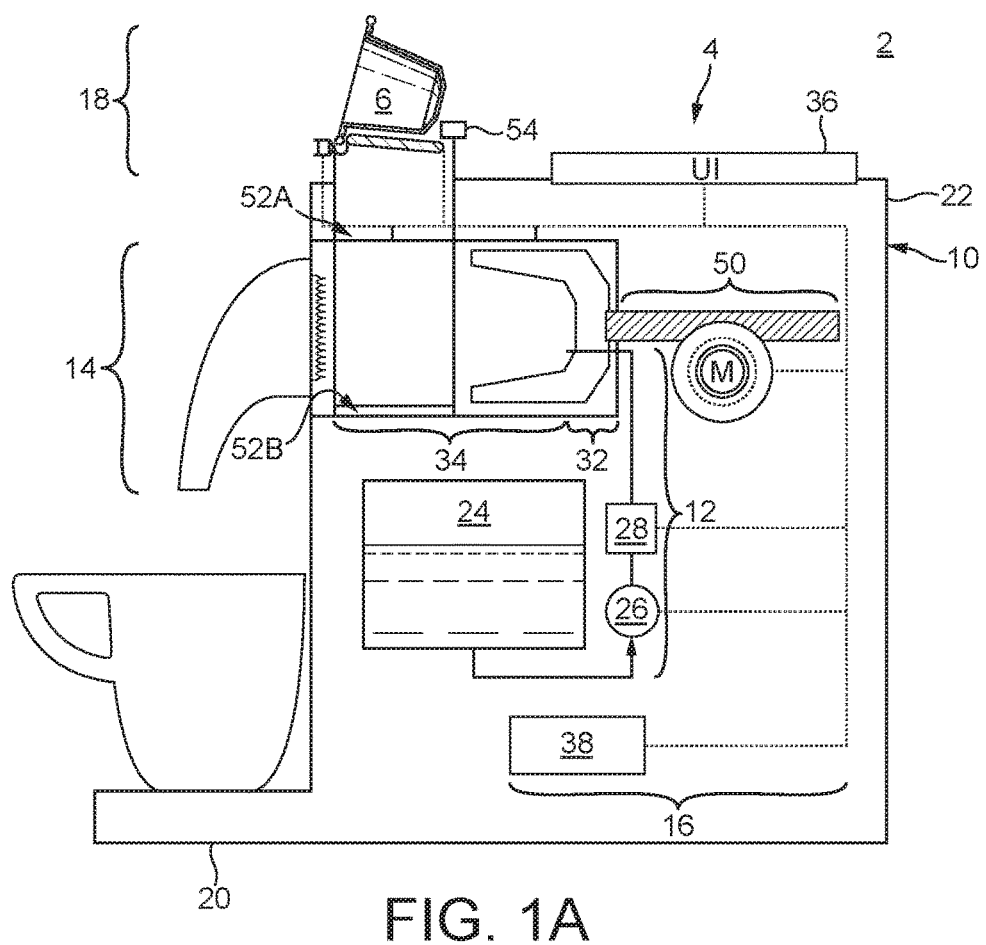
FIG. 1 shows illustrative views of embodiments of a preparation system that comprises a preparation machine and a container according to the presently disclosed and/or claimed inventive concept(s).

One non-limiting aspect of the presently disclosed and/or claimed inventive concept(s) is to provide a container for beverage or foodstuff preparation material that comprises a code that does not require complex processing.

It would be advantageous to provide such a code that is un-complicated such that it does not comprise a large number of symbols.

It would be advantageous to provide such a code that is cost-effective to produce and that can be read by a cost-effective code reader.

It would be advantageous to provide such a code that can be reliably read, particularly if soiled by foodstuffs or other contaminates.

It would be advantageous to provide such a code that can be adapted in size.

Objects and/or advantageous features of the presently disclosed and/or claimed inventive concept(s) are achieved by: the container disclosed herein; the machine disclosed herein; the system disclosed herein; the method disclosed herein; the attachments disclosed herein; the use of a container disclosed herein; the computer program disclosed herein; the non-transient computer readable medium disclosed herein.

Disclosed herein according to a first aspect of the presently disclosed and/or claimed inventive concept(s) is provided a container for (e.g. said container is food safe and, in certain non-limiting embodiments, hermitically sealable) a foodstuff or beverage preparation machine. The container for containing beverage or foodstuff preparation material.

The container may be a single-serving container, i.e. it comprises a dosage of foodstuff or beverage material for preparation of a single serving of said product. The container may be a single-use container, i.e. it is intended to be used in a single preparation process after which, in certain non-limiting embodiments, it is rendered unusable, e.g. by perforation, penetration, removal of a lid or exhaustion of said material. The container comprises generally on a surface thereof a code encoding preparation information, the code comprising a data sequence having a plurality of marker locations, whereby said marker locations either comprise or do not comprise a marker as a variable to at least partially encode the preparation information therein, with adjacent marker locations separated by a distance of $\Delta x$ (e.g. a distance between corresponding positions on the marker locations); at least one locator marker to enable location of the data sequence of the code, the locator marker having a read distance X2, which is distinct from a read distance X1 of the data markers to enable a locator marker to be identified.

Accordingly one non-limiting aspect of the presently disclosed and/or claimed inventive concept(s) is achieved since the location of the locator marker is convenient to determine. The locator marker may be arranged adjacent to the data sequence. Accordingly an object of the presently disclosed and/or claimed inventive concept(s) is solved since the marker locations of the data sequence do not require complex processing to read and decode.

The preparation information may comprise information that is related to a preparation process, e.g. one or more parameters used by the machine such as: temperature (e.g. at container inlet and/or at machine outlet); time; flow rate/volume; pressure; expiry date; container geometric properties (e.g. internal volume, type, shape); container identifier; recipe (e.g. a decomposition of a preparation operation into a plurality of phases, for which one or more of the aforesaid parameters specified).

To ensure there is sufficient information to identify the code and data sequence, in certain non-limiting embodiments, at least one or two of the marker locations of the data sequence comprises a marker.

The read distance X2 of the or each locator marker is at least 1.25 to 10 or 2 to 8 or 2 to 6 (or any value therebetween) times greater than or less than that of the read distance X1 of the data markers. The read distance can be defined as a length of a marker that is read by a reading head of a code reading device of the code reading system. In general herein the read distance is a width of a marker in the direction which the code is read in, i.e. the sequential direction.

The read distance X2 is distinct from the read distance X1 such that the locator marker is identifiable from the markers of the data sequence (and the absence of a marker), e.g. by means of a characteristic feature of the encoded preparation information provided by a code reading system when reading the code. Generally the encoded preparation information comprises a pulse or trough for each read marker and the characteristic feature comprises one or more of a list comprising: a pulse or trough of a different magnitude; a pulse width at a particular magnitude (including the baseline value) with a different duration; a different gradient at a particular magnitude. More particularly, the pulse or trough may have different magnitude by at least 10%-50% or any value therebetween. More particularly, pulse or trough may have a different period by at least 10%-300% or any value therebetween.

The adjacent marker locations of the data sequence are generally all substantially equally spaced such that $\Delta x$ is a single fixed amount. In this way the code is less complex to process.

The read distance X2 of the or each locator marker may be related to the distance $\Delta x$ between the plurality of marker locations of the data sequence, wherein the $\Delta x$ distance can be defined as the distance between corresponding points of marker locations. Advantageously the X2 length can be processed to determine the location of the marker locations in the data sequence. Advantageously the length of the code can be adapted in size to enable a different encoding density between containers for the same machine, i.e. the spacing of the marker locations can be changed by the X2 distance and processed without requiring a software update on the code processing system. Moreover, the X2 distance can be used to correct the read distance.

The data sequence comprises variable position marker locations unlike the prior art, wherein they are arranged next to each other in predetermined locations. In particular the marker locations are not directly next to each other (i.e. with no gap in-between) or do not have to have a gap the size of another marker location therebetween. To ensure sufficient separation of the marker locations, adjacent marker locations may be separated by at least 20% or 30% of a width of a marker. Such an arrangement is particularly advantageous when using an inductive sensor as its analogue signal requires adequate separation for reliable processing. Adjacent marker locations may not be separated by a width or a plurality of widths of marker locations. A width of a marker location is generally a stored value.

The said relationship may comprise the read distance X2 of the or each locator marker substantially equal to a multiple of one or more of the distances $\Delta x$ of the data sequence. The said multiple may be any suitable integer numerical value, e.g.: 2, 4, 8. The said multiple may be any suitable non-integer numerical value, e.g.: 1.5, 2.5, 3.5. An advantage of using a larger multiple (such as 2 or more, 3 or more, e.g.: 2-6 or 3-4) is that the determined X2 distance is less susceptible to errors when read, and thus when reduced in magnitude to determine $\Delta x$, the error in $\Delta x$ is minimised.

In this way $\Delta x$ can be considered a function $f$ of X2, i.e. $\Delta x=f(X2)$, wherein $f$ is the reciprocal of the said multiple (or alternatively rewriting as $X2=f(\Delta x)$, wherein $f$ is the said multiple). Alternatively the said relationship (and function $f$) may comprise X2 being composed of a plurality of X1 and $\Delta x'$ distances, whereby $\Delta x'$ is a gap between adjacent marker locations, i.e. $\Delta x=\Delta x'+X1$. In general X1 is a known (i.e. a stored) variable. In a particular (but non-limiting) example X2 comprises 3 X1 distances and 2 $\Delta x'$ distances (however various numbers of each, e.g. 1, 2, 3, 4, may be utilised), such that $X2=2\Delta x'+3X1$, hence $\Delta x'$ can be determined from X2 and $\Delta x$ determined from $\Delta x'$ (i.e. $X2=2\Delta x+X1$).

In certain non-limiting embodiments, a first marker location of the data sequence, i.e. the start of the data sequence, is arranged a distance $\Delta x$, from a reference position, whereby said reference position is typically an adjacent locator marker (e.g. in particular an adjacent edge thereof, whereby the $\Delta x$ distance is measure from said edge to a corresponding edge on said first marker location). Each marker location in the data sequence may be indexed from 1 to the number of bits encoded therein, whereby the 1 references said first marker location.

In certain non-limiting embodiments, the marker locations may encode a bit, e.g. a marker location comprising a marker encodes a 1 and a marker location not comprising a marker encodes a 0 (or the converse). The data sequence may encode at least 6 bits of preparation information. In certain non-limiting embodiments, 8, 10, 12 or more bits are encoded.

In certain non-limiting embodiments, the code is a 1-dimensional code, e.g. the markers of the code are generally arranged sequentially to each other, e.g. they are arranged sequentially along a single line that may be linear or circumferentially extending about an axis. The aforesaid X2 and $\Delta x$ distances are generally aligned in the said sequentially extending direction. Advantageously, the markers readably by a single reading head of a code reader. In certain non-limiting embodiments, the line is arranged at a periphery of the container, e.g. on the flange or periphery of the lid of the capsule or receptacle, or the rim of a packet.

The code is generally arranged about a container axis of rotation. In this way the code can be conveniently read by a code reader when there is relative rotational movement between a code reader and container about said axis. Advantageously, the code does not require the container to be supplied to the preparation machine with a particular orientation. The markers are typically radially aligned, i.e. a major axis thereof is aligned in the radial direction. The code may be arranged with an average position of a marker (i.e. the midpoint of the marker with respect to the radial direction) having a radial location of 0.5 cm-4 cm, or 0.9-3 cm.

In certain non-limiting embodiments, the markers of the data sequence are substantially the same shape. Advantageously, the markers are convenient to form. The markers of the data sequence are typically rectangular, and may comprise one or more of the following dimensions: a depth of 2 mm-5 µm or 1 mm-10 µm (i.e. when formed by engraving or embossing); a length of 20 mm-1 mm or 10 mm-1.5 mm or 5 mm-1.5 mm or 3 mm-2 mm; a width of 2 mm-0.2 mm or 2 mm-0.3 mm or 1 mm-0.4 mm or 0.9 mm-0.6 mm. A gap between adjacent markers/marker locations may be within 2 mm-0.3 mm, such as (but not limited to) within 1.5 mm-1 mm or 1 mm-0.6 mm. In the example wherein the markers are circumferentially arranged aforesaid can be considered average distances. In a specific example the markers comprise: a length of 2.5 mm; a nominal width of 0.75 mm; a nominal gap therebetween of 0.8 mm. Alternatively the markers may comprise circles or ellipses.

The locator markers may all be substantially the same shape or at least have substantially the same read distance. Advantageously, the locator markers are easy to form. The locator markers are typically rectangular The markers may be formed by one of the following: printing (e.g. by a conventional ink printer: advantageously the code can be conveniently and cost-effectively formed); engraving; embossing. In certain non-limiting embodiments, the markers are formed by electrically conductive portions, such as: indents formed by embossing on a conductive portion of the container/attachment. By forming the code with conductive portions an inductive sensor can comprise the code reader. Advantageously, such a code/sensor configuration is not sensitive the code being soiled by foodstuff or other contaminants. Moreover, the code can be applied and read cost-effectively. The code may be formed directly on a surface of the container, e.g. the substrate for the markers is integral with the container. Alternatively the code may be formed on an attachment (i.e. the attachment according to the fifth aspect), which is attached to the container.

Generally the container comprises a plurality of the aforesaid codes. Advantageously, the encoded preparation information read from each can be processed and checked for consistency. Moreover, the encoded information is less vulnerable if one of the codes is damaged or otherwise unreadable.

The container may comprise the beverage or foodstuff preparation material contained therein. The container may comprise one of the following: a capsule; packet; a receptacle for consumption of the beverage or foodstuff therefrom. The capsule may have an internal volume of 5-80 ml. The receptacle may have an internal volume of 150-500 ml or 0.25-500. The packet may have an internal volume of 150-350 ml or 200-300 ml or 50-150 depending on the application.

Disclosed herein according to a second aspect of the presently disclosed and/or claimed inventive concept(s) is provided a beverage or foodstuff preparation machine comprising: a preparation unit to receive a container according to the first aspect and to prepare a said beverage or foodstuff therefrom; a code processing system operable to: read a code of a container to obtain encoded preparation information, process the encoded preparation information to decode said information; a control system operable to effect one more of the following: control of said preparation unit using said decoded preparation information (e.g. to execute a preparation operation); use the operation information to monitor container consumption for re-ordering, e.g. via a server system through a communication interface; use preparation information to determine if a container has exceeded its expiry date.

The code processing system may be configured to process the encoded preparation information to locate one or more code reads therein by locating a locator marker that has a characteristic read distance X2 (e.g. a particular read distance is stored on the code processing device, or is identifiable from the read distances of the markers of the data sequence), which is distinct from the read distance X1 of the markers of the data sequence (and, in certain non-limiting embodiments, identifiable against the absence of a marker), and is further configured to: locate from said locator marker and associated data sequence; determine the presence of a marker at each marker location of the data sequence.

Locating from said locator marker and associated data sequence may comprise the data sequence arranged at a particular position with respect to the associated locator marker, e.g. adjacent thereto.

Determining the presence of a marker at each marker location of the data sequence may comprise determining a reference position (such as an adjacent edge of a locator marker), to which the $\Delta x$ distances can be added to determine a position of the marker locations.

Determining the presence of a marker at each marker location of the data sequence may comprise: determining a read distance X2 of the located locator marker; using X2 to determine the $\Delta x$ distance between adjacent marker locations of the data sequence. Determining a distance $\Delta x$ between adjacent marker locations of the data sequence using X2 may comprise setting $\Delta x$ equal to X2 or applying a function to X2, i.e. whereby $X2=f(\Delta x)$.

For a code wherein the first marker location of the data sequence, i.e. the start of the data sequence, is arranged a distance $\Delta x$, from a reference position (e.g. an adjacent edge of an adjacent locator marker), said determining the presence of a marker at each marker location of the data sequence may comprise: adding subsequent $\Delta x$ distances to the reference position to identify subsequent marker locations. Alternatively it may comprise: identifying markers comprising the data sequence and their distance from said reference point; dividing the said distance by $\Delta x$ and applying a floor and/or ceiling function to the result to determine an index of the marker location that the marker relates to.

A first value may be assigned to a marker location when a marker is present and a second value assigned when absent. The first value may be a 1 and the second value may be a 0 or the converse. The preparation information can be determined from the compilation of said first or second values.

Processing the encoded preparation information may comprise checking a number of code reads therein; if below a predetermined amount then processing is either terminated or more code reads are obtained. The predetermined amount may be 2, 3, 4, 5 or more. Processing the encoded preparation information may comprise: checking a code read for an error; if an error is detected then the erroneous code read is discarded. Error checking may comprise: checking a calculated read length of a portion of a code read (e.g. a length of a sequence such as the data sequence) or an entire code read; checking a maximum number of markers identifiable in a portion of a code read or an entire code read; checking if the encoded preparation information is identical between code reads.

The encoded preparation information may comprise information relating to a plurality of pulses, whereby a pulse of the absence thereof relates to a marker of the code.

For said processing the code processing system generally comprises a processor having a code processing program. For control of the preparation unit the control system comprises the said processor or a further processor, which comprises a beverage preparation program. Both systems may be integrated.

The preparation unit may be configured to prepare a said beverage or foodstuff therefrom in various manners. The preparation unit may be configured to extract an ingredient of the beverage or foodstuff from a container (i.e. a capsule or a packet that comprise the code) and during preparation, and comprises: a fluid supply; and an extraction unit, the extraction unit operable to receive said container and to supply fluid from the fluid supply thereto, whereby a prepared beverage or foodstuff is dispensed from the extraction unit into a receptacle (i.e. the receptacle does not comprise the code) for consumption therefrom. The preparation unit is operable to dispense a beverage or foodstuff into a container (i.e. a receptacle that comprises the code) configured for end-user consumption therefrom and comprises: a fluid supply; and a mixing unit, the mixing unit operable to mix fluid from the fluid supply with preparation material from a preparation material container of the preparation unit. The preparation unit is operable to prepare a beverage or foodstuff in a container (i.e. a receptacle that comprises the code) configured for end-user consumption therefrom and comprises: a fluid supply; and a mixing unit, the mixing unit operable to mix fluid from the fluid supply with preparation material supplied in said receptacle. The preparation unit is operable to prepare a beverage or foodstuff (e.g. using the aforesaid fluid supply and mixing unit) in a receptacle (that does not comprise the code) configured for end-user consumption therefrom, and is operable to dispense preparation material from a container (i.e. a capsule or packet comprising the code) into said receptacle.

The code reading system may be operable to effect read the code of a container when received by the machine, and in certain non-limiting embodiments, such that encoded preparation information is provided to the code processing device. Said reading of the code may comprise control of a code reading mechanism of the code reading system to effect relative movement between the code and a code reader.

Disclosed herein according to a third aspect of the presently disclosed and/or claimed inventive concept(s) is provided a beverage or foodstuff preparation system comprising a container according to the first aspect and a beverage or foodstuff preparation machine according to the second aspect.

Disclosed herein according to a fourth aspect of the presently disclosed and/or claimed inventive concept(s) is provided a method of preparing a beverage or foodstuff, using the system according to the third aspect, the method comprising: reading a code of a container to obtain encoded preparation information; processing the encoded preparation information to decode said information; operating a control system to effect one more of the following: control of said preparation unit using said decoded preparation information; use the operation information to monitor container consumption for re-ordering, e.g. via a server system through a communication interface; use preparation information to determine if a container has exceeded its expiry date.

The method may further comprise any of the steps for processing of the code as defined by the second aspect.

Disclosed herein according to a fifth aspect of the presently disclosed and/or claimed inventive concept(s) is provided an attachment configured for attachment to a container of a beverage or foodstuff preparation machine according to the first aspect. The attachment may comprise: a carrier carrying on a surface thereof a code as described in the first aspect; an attachment member for attachment to said container. In certain non-limiting embodiments, the attachment member is configured for attaching said carrier to the container as if it were formed integrally on the container. In this way it can be read by the code reading device as if it formed integrally thereto. Examples of suitable attachment members comprise: an adhesive strip; a mechanical fastener such as a clip or bolt. The attachment can be considered a code support member. The attachment may be for attachment to part of the container, e.g.: generally part of or the entire lid, flange, body of a capsule or receptacle; a rim or of a packet. The attachment may be shaped corresponding to a periphery of the container, e.g. it is disk or annular shaped.

The attachment may comprise part of the system according to the third aspect, i.e. a system comprising the said machine the attachment attached to the container which may not otherwise comprise a code.

In a similar manner the method according to the fourth aspect may comprise attaching the attachment to a container which may not otherwise comprise the code and subsequently performing the said method.

Disclosed herein according to a sixth aspect of the presently disclosed and/or claimed inventive concept(s) is provided an attachment configured for attachment to a beverage or foodstuff preparation machine according to the second aspect. The attachment may comprise: a carrier carrying on a surface thereof a code as described in the first aspect; an attachment member for attachment to said machine. In certain non-limiting embodiments, the attachment member is configured for attaching said carrier to the machine at a position between code reading device of said machine and the container when received, such that the code thereon is proximate said container. In this way it can be read by the code reading device as if it were attached to the container. Examples of suitable attachment members comprise: extensions attached to said carrier comprising an adhesive strip or a mechanical fastener such as a clip, bolt or bracket.

The attachment may comprise part of the system according to the third aspect, i.e. a system comprising the said machine the attachment attached to the machine and a container which may not otherwise comprise a code.

In a similar manner the method according to the fourth aspect may comprise attaching the attachment to the machine and subsequently performing the said method using a container which may not comprise said code.

Disclosed herein according to a seventh aspect of the presently disclosed and/or claimed inventive concept(s) is provided a use of a container as defined in the first aspect or the attachments as defined in the fifth and sixth aspect for a beverage or foodstuff preparation machine as defined in the second aspect.

Disclosed herein according to an eighth aspect of the presently disclosed and/or claimed inventive concept(s) is provided a computer program (which can be considered a code processing program) for a processor of a code processing system of a beverage or foodstuff preparation machine as defined the second aspect, the computer program comprising program code to: obtain (e.g. by controlling a code reading system) encoded preparation information of a code of a container according to the first aspect; process the encoded preparation information to decode said information.

The computer program may further comprise program code for effecting any of the steps of processing of the encoded preparation information as defined by the second aspect.

The computer program typically outputs the decoded preparation information to a main beverage preparation program, which is executed to perform a preparation operation using said decoded information.

Disclosed herein according to a ninth aspect of the presently disclosed and/or claimed inventive concept(s) is provided a non-transitory computer readable medium comprising the computer program according to seventh aspect. The non-transitory computer readable medium may comprise a memory unit of the processor or other computer-readable storage media for having computer readable program code stored thereon for programming a computer, e.g. a hard disk, a CD-ROM, an optical storage device, a magnetic storage device, Flash memory.

The above aspects of the presently disclosed and/or claimed inventive concept(s) may be combined in any suitable combination. Moreover, various features herein may be combined with one or more of the above aspects to provide combinations other than those specifically illustrated and described. Further objects and advantageous features of the presently disclosed and/or claimed inventive concept(s) will be apparent from the claims, from the detailed description, and annexed drawings.

Preparation System

A beverage or foodstuff preparation system 2, an example of which is illustrated in FIG. 1, comprises at a first level thereof: a beverage or foodstuff preparation machine 4; a container 6, which are described sequentially.

Preparation Machine

Figure 1B:
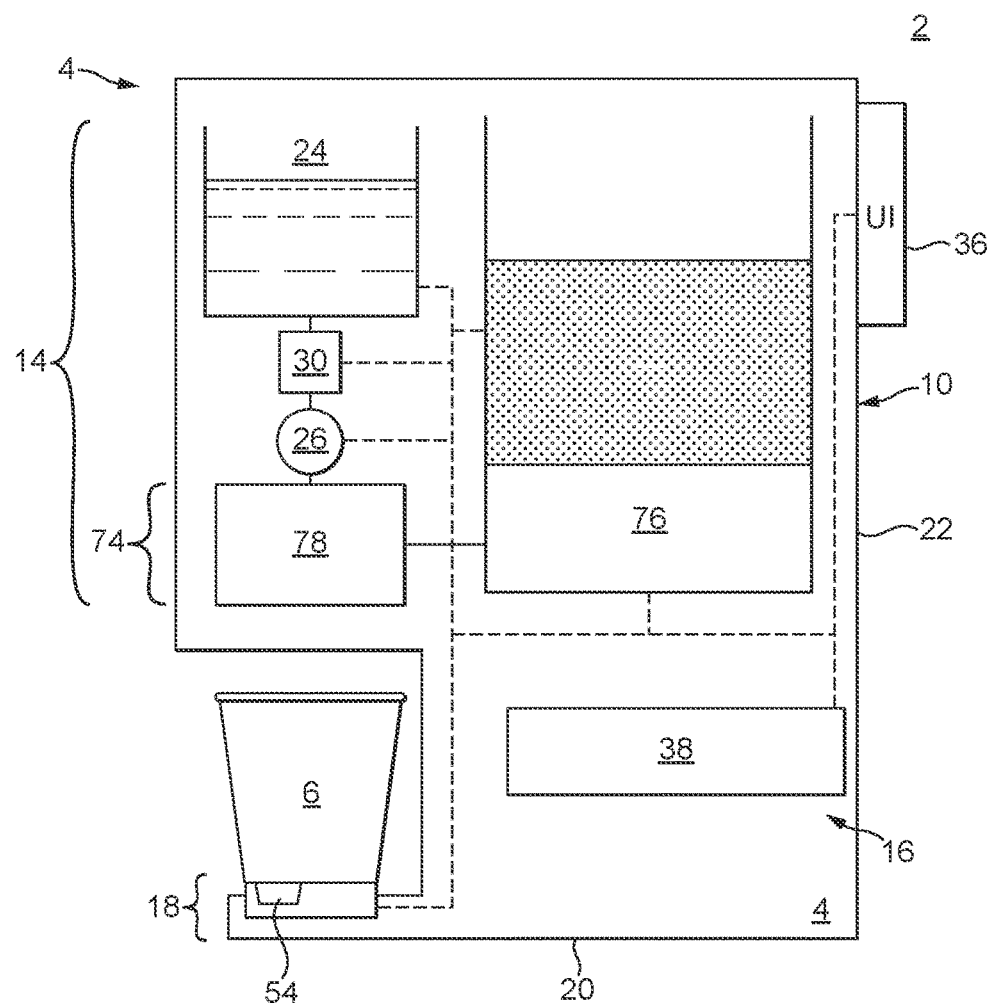

The beverage or foodstuff preparation machine 4 is operable to process a portion of beverage or foodstuff material, hereon preparation material, to a foodstuff and/or beverage for consumption by eating and/or drinking. A foodstuff material as defined herein may comprise a substance capable of being processed to a nutriment generally for eating, which may be chilled or hot, non-exhaustive examples of which are: yoghurt; mousse; parfait; ice cream; sorbet; breakfast cereals; semolina; couscous; custard; smoothies. A beverage material as defined herein may comprise a substance capable of being processed to a potable substance, which may be chilled or hot, non-exhaustive examples of which are: tea; coffee, including ground coffee; hot chocolate. The preparation machine 4 is generally dimensioned for use on a work top, i.e. it is less than 70 cm in length, width and height. The preparation machine 4 may have various configurations depending on the particular type of beverage and/or foodstuff it is intended for preparation of, examples of which are:

a first embodiment, an example of which is shown in FIG. 1A, wherein the preparation machine 4 is generally for beverage preparation and is operable to extract one or more ingredients of preparation material within a single use container 6 (comprising a latter mentioned code), such as a packet or capsule, and to dispense said ingredients into an alternate receptacle for end-user consumption (which does not comprise a code), examples of suitable preparation machines 4 are disclosed in EP 2393404 A1, EP 2470053 A1, EP 2533672 A1, EP 2509473 A1 EP 2685874 A1, EP 2594171 A1, which are incorporated herein by reference;

a second embodiment, an example of which is illustrated in FIG. 1B, wherein the preparation machine 4 is for beverage or foodstuff preparation and is operable to prepare preparation material that is supplied in a container 6 that is a receptacle (comprising the latter mentioned code) for end-user consumption therefrom, example of a suitable preparation machine is provided in PCT/EP13/072692, WO 2013/014142, WO 2010/034722, which are incorporated herein by reference;

a third embodiment (not shown) wherein the preparation machine 4 is generally for foodstuff preparation and is operable to dispense preparation material that is supplied in a container 6 (which comprises the code), such as a packet or capsule, into an alternate receptacle (which does not comprise the code) for end-user consumption, wherein the foodstuff is prepared in the said receptacle, an example of a suitable preparation machine is disclosed in PCT/EP13/072692, and EP 14167344A, which is incorporated herein by reference.

For completeness a several such preparation machines 4 will now be described in more detail, which can be considered to comprise at a first level thereof: a housing 10; a preparation unit 14; a control system 16; code processing system 18, which are described sequentially.

Housing

The housing 10 houses and supports said first level components and comprises at a second level of the preparation machine 4: a base 20 for abutment of a horizontally arranged support surface; a body 22 for mounting thereto the other first level components.

Preparation Unit

Depending on the embodiment of the preparation machine 4, the preparation unit 14 is operable to prepare a foodstuff/beverage from preparation material arranged in: a single-serving, single use container 6 that is a packet or capsule; a container 6 that is a receptacle for end-user consumption therefrom; a combination thereof. Embodiments of each configuration will be discussed.

In general all the embodiment preparation units 14 comprises a second level of said machine 4 a fluid supply 12 that is operable to supply fluid, which is in general water or milk that maybe conditioned (i.e. heated or cooled) to the container 6. The fluid supply 12 typically comprises at a third level of said machine 4: a reservoir 24 for containing fluid, which in most applications is 1-5 liters of fluid; a fluid pump 26, such as a reciprocating or rotary pump that may be driven by an electrical motor or an induction coil; a an optional fluid heater 28, which generally comprises an in-line, thermo block type heater; an outlet for supply of the fluid. The reservoir 24, fluid pump 26, fluid heater 28, and outlet are in fluid communication with each other in any suitable order. In an alternative example the fluid supply 12 may comprise a connection to an external fluid source e.g. a water main.

Preparation Unit for Extraction of Beverage Ingredients from Container

According to the first embodiment of the preparation machine 4, an example of which is illustrated in FIG. 1A, the preparation unit 14 is for extraction and is operable: to receive the container 6 containing beverage preparation material; process the container 6 to extract one or more ingredients of a beverage therefrom, and to dispense the said ingredients into an alternate receptacle 8 for end-user consumption. The container is generally a single-use, single-serving container such as a capsule or packet. A preparation unit 14 for use with the said capsule will initially be described followed by a variant machine for use with said packet.

The preparation unit 14 further comprises an extraction unit 30, which is operable to move between a capsule receiving position and a capsule extraction position, when moving from the capsule extraction position to the capsule receiving position, the extraction unit may be moved through or to a capsule ejection position, wherein a spent capsule can be ejected therefrom. The extraction unit 30 typically comprises: an injection head 32; a capsule holder 34; a capsule holder loading system 50; a capsule insertion channel 52A; a capsule ejection channel 52B, which are described sequentially.

The injection head is configured to inject fluid into a cavity of the capsule when held by the capsule holder, and to this end has mounted thereto an injector, which has a nozzle that is in fluid communication with the outlet of the fluid supply.

The capsule holder is configured to hold the capsule during extraction and to this end it is operatively linked to the injection head. The capsule holder is operable to move to implement the said capsule receiving position and capsule extraction position: with the capsule holder in the capsule receiving position a capsule can be supplied to the capsule holder from the capsule insertion channel; with the capsule holder in the capsule extraction position a supplied capsule is held by the holder, the injection head can inject fluid into the cavity of the held capsule, and one or more ingredients can be extracted therefrom. When moving the capsule holder from the capsule extraction position to the capsule receiving position, the capsule holder can be moved through or to the said capsule ejection position, wherein a spent capsule can be ejected from the capsule holder via the capsule ejection channel.

The capsule holder loading system is operable to drive the capsule holder between the capsule receiving position and the capsule extraction position.

The preparation unit 14 can operate by means of injection of fluid at pressure into the cavity of the capsule 6, e.g. at up to 20 bar, which can be achieved by means of the injection head and pump 26. It may alternatively operate by centrifugation as disclosed in EP 2594171 A1, which is incorporated herein by reference. Further examples of suitable preparation units are provided in EP 2393404 A1, EP 2470053 A1, EP 2533672 A1, EP 2509473 A1 EP 2685874 A1 and EP 2594171 A1.

In the example of the container 6 comprising a packet the extraction unit 30 is operable to receive the packet and to inject, at an inlet thereof, fluid from the fluid supply 12. The injected fluid mixes with preparation material within the packet to at least partially prepare the beverage, which exits the packet via an outlet thereof. The extraction unit 30 comprises: a support mechanism to receive an unused packet and eject a spent packet; an injector configured to supply fluid to the packet from the outlet of the fluid supply. Further detail is provided in WO 2014/125123, which is incorporated herein by reference.

Preparation Unit for Preparation in Container

According to the second embodiment of the preparation machine 4, an example of which is illustrated in FIG. 1B, the preparation unit 14 is operable to prepare preparation material in a container 6 that is a receptacle for end-user consumption therefrom, such as a cup. Herein the preparation unit 14 further comprises a mixing unit 74, examples of which are described following.

In a first example (as shown in FIG. 1B) mixing unit 74 comprises a: preparation material processing unit 76 operable to extract a predetermined dosage of preparation material from a preparation material container; a dispensing unit 78 operable to dispense fluid from the fluid supply 12 mixed with said dosage of preparation material to the container 6, such an example is disclosed in more detail in the aforesaid WO 2010/034722.

In a second example (not shown) the container 6 is supplied with the preparation material therein and the mixing unit 14 comprises an agitator unit to mix the preparation material with fluid supplied from the fluid supply 12, such an arrangement is disclosed in the aforesaid PCT/EP13/072692, WO 2013/014142 and WO 2010/034722.

According to the third embodiment of the preparation machine 4, in a variant of the directly preceding second example, the preparation unit 14 further comprises a dispensing mechanism for receiving a container 6 (in the form of a packet or capsule that comprises the code) and dispensing the associated preparation material into the receptacle, where it is prepared. Such an example is disclosed in the aforesaid EP 14167344 A.

Control System

Figure 2:
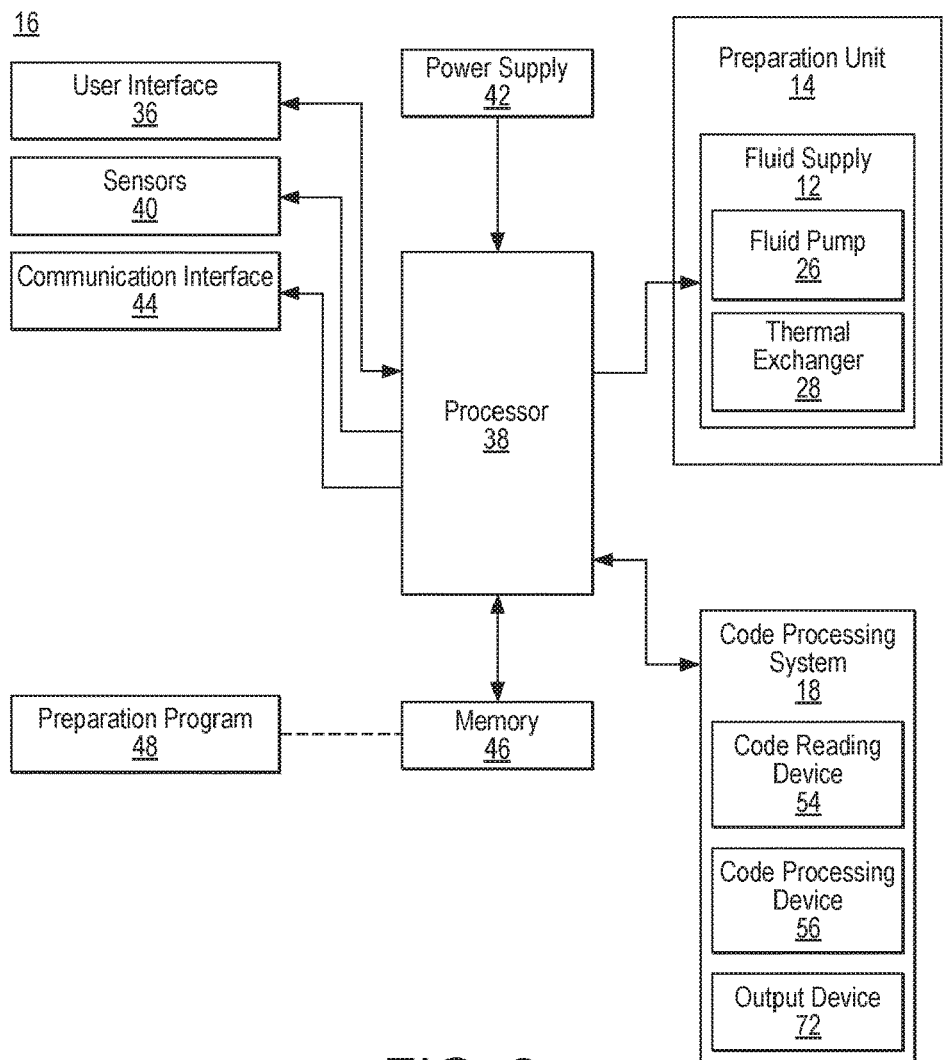
FIG. 2 is block diagram of a control system for the preparation machines of FIG. 1.

The control system 16, an example of which is illustrated in FIG. 2, is operable to control the preparation unit 14 to prepare the beverage/foodstuff. The control system 16 typically comprises at a second level of said machine 4: a user interface 36; a processor 38; optional sensors 40; a power supply 42; an optional communication interface 44, which are described sequentially.

The user interface 36 comprises hardware to enable a user to interface with the processor 38 and hence is operatively connected thereto. More particularly: the user interface receives commands from a user; a user interface signal transfers the said commands to the processor 38 as an input. The commands may, for example, be an instruction to execute a preparation process and/or to adjust an operational parameter of the preparation machine 4 and/or to power on or off the beverage preparation machine 4. The processor 38 may also output feedback to the user interface 36 as part of the preparation process, e.g. to indicate the beverage preparation process has been initiated or that a parameter associated with the process has been selected. The hardware of the user interface 36 may comprise any suitable device(s), for example, the hardware comprises one or more of the following: buttons, such as a joystick button or press button; joystick; LEDs; graphic or character LDCs; graphical screen with touch sensing and/or screen edge buttons.

The sensors 40 are operatively connected to the processor 38 to provide an input for monitoring of the preparation process and/or a status of the preparation machine 4. The input can be an analogue or digital signal. The sensors 40 typically comprise one or more of the following: fluid level sensors associated with the reservoir 24; flow rate sensors associated with the fluid pump 26; temperature sensors associated with the thermal exchanger 28; position sensors associated with the preparation unit 14 that are operable to sense the position of a component (e.g. for the extraction unit) thereof. In the second embodiment of the preparation machine 4, the sensors may further comprise one or more of the following: fluid level sensors operable to measure a fluid level in the receptacle; sensors for measuring a temperature of a product in the receptacle; sensors for measuring the torque applied by the mixing head of the agitator unit to the product; sensors for measuring the velocity of the mixing head of the agitator unit; receptacle detection sensors to detect the presence of the receptacle supported by a receptacle support. In the third embodiment of the preparation machine 4, the sensors may further comprise one or more of the following: container 6 (i.e. capsule or packet) detection sensors to detect the presence of the container supplied by a user.

The processor 38 is operable to: receive an input, i.e. the commands from the user interface 36 and/or from the sensors 40; process the input according to program code stored on a memory unit (or programmed logic); provide an output, which is generally a preparation process. In particular the output may comprise: operating the code processing system 18 to determine preparation information on the container 6; operating the preparation unit 14 in accordance with said determined information. Operation of the preparation unit 14 can be open-loop control, or in certain non-limiting embodiments, closed-loop control using the input signal from the sensors 40 as feedback. The processor 38 generally comprises memory, input and output system components, which are arranged as an integrated circuit, typically as a microprocessor or a microcontroller. The processor 38 may comprise other suitable integrated circuits, such as: an ASIC; a programmable logic device such as an FPGA; an analogue integrated circuit, such as a controller. For such devices, where appropriate, the aforementioned program code can be considered programed logic or to additionally comprise programmed logic. The processor 38 may also comprise one or more of the aforementioned integrated circuits, i.e. multiple processors. The processor 38 generally comprises a memory unit 46 for storage of the program code and optionally data. The memory unit typically comprises: a non-volatile memory e.g. EPROM, EEPROM or Flash for program code and operating parameter storage; volatile memory (RAM) for data storage. The memory unit may comprise separate and/or integrated (e.g. on a die of the processor) memory.

The program code stored on a memory unit (or programmed logic) can be idealised as comprising a preparation program 48 that is executable by the processor 38 to execute said preparation process. Typically the preparation process comprises: determining the preparation information from the container (i.e. by interfacing with the code processing system 18); using to control the preparation unit 14 said information and/or other information that may be stored as data on the memory unit 46 and/or input via the user interface 36. The determined preparation information may as an alternative or in addition be used by the preparation program 48 or a device in communication therewith (e.g. a server communicating with the preparation machine over a network such as the internet via a communication interface) to: monitor container 6 consumption for re-ordering; to scheduled maintenance of the preparation machine; to monitor machine usage.

The power supply 42 is operable to supply electrical energy to the processor 38 and associated first level components. The power supply 42 may comprise various means, such as a battery or a unit to receive and condition a mains electrical supply. The power supply 42 may be operatively linked to part of the user interface 36 for powering on or off the preparation machine 4.

The communication interface 44 is for data communication of the beverage preparation machine 4 with another device/system, typically a server system. The communication interface 44 can be used to supply and/or receive information related to the preparation process, such as container consumption information and/or preparation process information. The communication interface 44 can be configured for cabled media or wireless media or a combination thereof, e.g.: a wired connection, such as RS-232, USB, $I^2C$, Ethernet define by IEEE 802.3; a wireless connection, such as wireless LAN (e.g. IEEE 802.11) or near field communication (NFC) or a cellular system such as GPRS or GSM. The communication interface 44 is operatively connected to the processor 38. Generally the communication interface comprises a separate processing unit (examples of which are provided above) to control communication hardware (e.g. an antenna) to interface with the maser processor 38. However, less complex configurations can be used e.g. a simple wired connection for serial communication directly with the processor 38.

Code Processing System

The code processing system 18 is operable to: read a code on the container 6 to obtain encoded preparation information; process the encoded preparation information to decode the information. The code processing system 18 comprises a: code reading device 54; code processing device 56; output device 72, which are described sequentially.

The code reading device 54 is operable to read the code to obtain encoded preparation information and to transfer said information to the code processing device 56. The code reading device 54 may be configured to read the code with relative movement between a code reader thereof and the container 6, e.g. by relative rotation or translation between a code reader and the code. Examples of suitable systems for providing said relative movement are disclosed in EP 14176243.5 A, EP 15151959 A, EP 15151958 A, EP 2594171 A1, which are incorporated herein by reference. In such an example the code reading device 54 can be considered to comprise a code reader and a code reading mechanism, the code reading mechanism comprising an actuator and a drive train. As an example of such a device, the drive train may comprise a rotary member operable to rotate about an axis of rotation of a stationary container 6, the rotary member having the code reader mounted thereto, the actuator operable to drive said rotary member to rotate to effect reading of the code. In a variant, the drive train may comprise a rotary member to abut and rotate the container 6, whereby the code reader remains stationary at a radial distance from the container 6 axis of rotation.

In such examples the code reading mechanism generally comprises a read cycle sensor, which is operable to provide a read cycle signal. The read cycle signal comprises information to determine the number of read cycles contained in an acquired portion of the encoded preparation information, as will be discussed. The read cycle sensor may for example be operable to sense each rotation of the container 6 or actuator unit or other part of the drive train to provide the read cycle signal. As an example the read cycle sensor comprises a magnetic element that is driven to rotate proximate a stationary hall sensor.

Alternatively, the code reading device 54 is configured to read the code statically, i.e. without relative movement between the code reading device 54 and container, e.g. the code reading device 54 comprises an image capturing device operable to provide a digital image of the code.

The code reading device 54 may comprise various readers, which are selected in accordance with the particular formation of the code on the container 6 and the reading configuration. For example: for a code that is embossed or engraved as conductive portions on the container 6 the reader may be an inductive sensor; for a code that is printed on the container 6 the reader may be an optical sensor. An example of a suitable inductive sensor is a POSIC Sensor (www.posic.ch) reference ID1301 000002. With such a sensor one particular desired (but non-limiting) reading configuration is: relative velocity of the code to the sensor 0.137 m/s; embossing depth 0.3 mm; reading distance 0.5 mm. A further example of a suitable inductive sensor is a Texas LDC 1000 series sensor. An example of a suitable optical sensor is a light source, lens and light sensor operable to translate optical impulses into electrical impulses. An example of a suitable image capturing device is a Sonix SN9S102; Snap Sensor S2 imager; an oversampled binary image sensor.

The code processing device 56 is operatively connected to the code reading device 54 and is operable to process the encoded preparation information obtained by the code reading device to decode said information. Processing of the encoded preparation information is discussed in the following paragraphs. The code processing device 56 may comprise a processor such as a microcontroller or an ASIC. It may alternatively comprise the aforesaid processor 38, in such an embodiment it will be appreciated that the output device is integrated in the processor 38. For the said processing the code processing device 56 typically comprises a code processing program, which comprises program code for said processing. An example of a suitable code processing device is the Texas Instruments TMS320C5517.

The output device 72 is operatively connected to the code processing device 56 and is operable to output data (typically digital data) that comprises the decoded preparation information to the processor 38, e.g. by means of a serial interface.

Container

The container 6 may comprise, depending on the embodiment of the preparation machine 4 a: receptacle comprising preparation material for preparation and end-user consumption therefrom; a capsule or packet comprising preparation material for preparation therefrom. The container 6 may be formed from various materials, such as metal or plastic or a combination thereof. In general the material is selected such that it is: food-safe; it can withstand the pressure/temperature of the preparation process. Generally the container is hermitically sealable for preservation of the preparation material. Suitable examples of containers are provided following.

The container 6 when not in packet form generally comprises: a body portion 58 defining a cavity for the storage of a dosage of a preparation material; a lid portion 60 for closing the cavity, for example (but not by way of limitation) such that is its hermetically sealed; a flange portion 62 for connection of the body portion and flange portion, the flange portion generally being arranged distal a base of the cavity. The body portion may comprise various shapes, such as a disk, frusto-conical or rectangular cross-sectioned. Generally the body portion is axisymmetric. Accordingly, it will be appreciated that the container 6 may take various forms, an example of which are provided in FIG. 3A, which may generically extend to a receptacle or capsule as defined herein. The container 6 may be distinguished as a receptacle for end-user consumption therefrom when configured with an internal volume of 250-500 or 150-350 ml. In a similar fashion a capsule may be distinguished when configured with an internal volume of less than 100 ml.

Figure 3A:
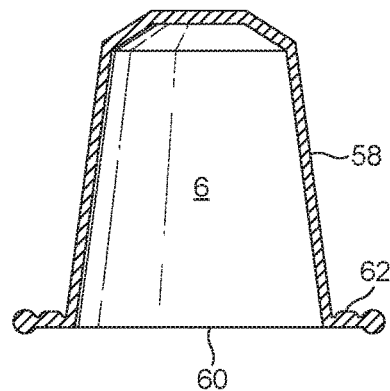
FIG. 3 shows embodiment containers for the system of FIG. 1.
Figure 3B:
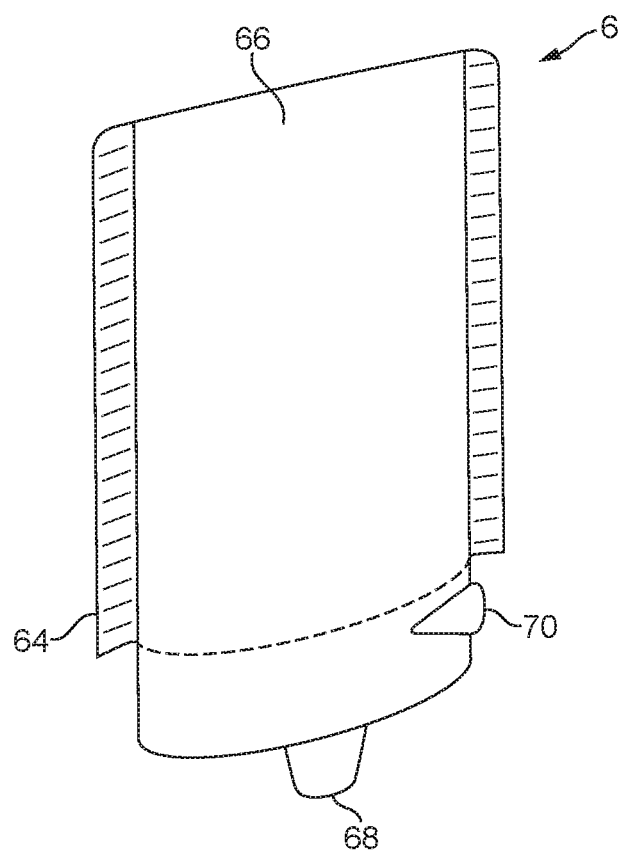

The container 6 when in packet form as shown in FIG. 3B generally comprises: an arrangement of flexible sheet material 64 (such as one or more sheets joined at their periphery) defining an internal volume 66 for the storage of a dosage of a preparation material; an inlet 68 for inflow of fluid into the internal volume 66; an outlet 70 for outflow of fluid and beverage/foodstuff material from the internal volume. Typically the inlet 68 and outlet 70 are arranged on a body of an attachment (not shown), which is attached to the sheet material. The sheet material may be formed from various materials, such as metal foil or plastic or a combination thereof. Typically the volume 66 may be 150-350 ml or 200-300 ml or 50-150 depending on the application.

Information Encoded by Code

A code 94 of the container 6 encodes preparation information, which generally comprises information related to the associated preparation process. Depending of the embodiment of the preparation machine 4 said information may encode one or more parameters, which may comprise one of more of a: fluid temperature (at container inlet and/or outlet to receptacle); fluid mass/volumetric flow rate; fluid volume; phase duration (e.g. a duration for applying the aforesaid parameters); container geometric parameters, such as shape/volume; other container parameters e.g. a container identifier, expiry date, which may for example be used to monitor container consumption for the purpose of container re-ordering.

Arrangement of Code

The code 94 is arranged on an exterior surface of the container 6 in any suitable position such that it can be processed by the code processing system 18. In the afore-discussed example of a receptacle/capsule, as shown in FIG. 3A, the code can be arranged on any exterior surface thereof, e.g. the lid, body or flange portion. In the afore-discussed example of a packet 6, as shown in FIG. 3B, the code can be arranged in any exterior surface thereof, e.g. either or both sides of the packet, including the rim. The code 94 may have various arrangements on said containers 6, e.g.: a linear arrangement for reading by a reciprocating motion; a particular (but non-limiting) circumferentially extending arrangement about the container axis of rotation such that the code 94 can be read during rotational of the container 6 (or a code reader) about said axis.

Figure 4:
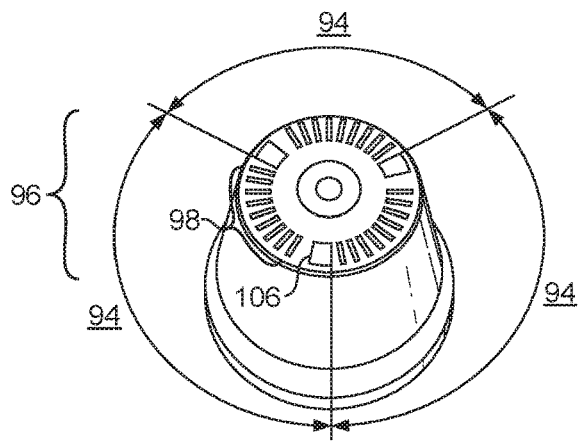
FIGS. 4-8 show embodiment codes for containers for the system of FIG. 1.

FIG. 4 shows a specific example, wherein the code 94 is arranged on an exterior surface of a base of the body portion 60 of the container 6, which can be a capsule or receptacle as defined herein. In particular the code 94 is arranged circumferentially about the container axis of rotation.

Composition of Code

The code 94 may be repeated a plurality of times on the container 6, for example 2-6 times, with each repetition thereof referred to as a code repetition. In the case of a single code repetition, code 94 may be read a single time, or in a particular (but non-limiting) example, the code 94 is read a plurality of times and the code processing device 38 is operable to perform a step of checking the reads of the code correspond to each other. Alternatively, in a particular (but non-limiting example wherein the code comprises a plurality of code repetitions (e.g. in FIG. 4 there are three code repetitions), each code repetition is read once or is read a plurality of times The code 94 is composed of plurality of markers 96, 106, which are of a shape for identification of the marker (in comparison to the absence thereof) in the encoded preparation information. Generally all the markers comprise substantially the same shape (i.e. those comprising the data sequence are the same shape and those comprising the locator marker are the same shape) such that a characteristic feature (e.g. a pulse) is provided in the encoded preparation information. In a particular (but non-limiting) example the markers 96, 106 are rectangular, however they may be other shapes such as square or circular. In the example of FIG. 4 the markers 96,106 are rectangular with the major axis arranged radially aligned.

Typically the markers 96,106 are formed by: printing e.g. my means of an ink printer; embossed; engraved; applying metallic layers to a non-metallic substrate (e.g. a PET strip); otherwise known means. As an example of printing the ink may be conventional printer ink and the substrate may be: polyethylene terephthalate (PET); aluminium coated with a lacquer (as found on Nespresso™ Classic™ capsules) or other suitable substrate. As an example of embossing the shape may be pressed into a plastically deformable substrate (such as the aforesaid aluminium coated with a lacquer) by a stamp. Embossing may comprise an indent that extends normal to the surface of the receptacle in either direction (i.e. the markers 96 can be defined by the absence or presence of the indent).

The dimensions of the markers 96, 106 vary with the dimensions of the container 6 and the resolution of the code reading device 54. Generally, in a particular (but non-limiting) embodiment, the markers 96 (i.e. those comprising the data sequence 98, which is discussed following) when rectangular have the following dimensions: 0.6 mm-10 µm in depth, with a depth of 0.05 mm; 1.5 mm-5 mm in length, with a length of 2.5 mm; 10 mm-0.4 mm in width, with a width of 0.75 mm. The distance between markers 96 varies as discussed following, however it is generally within the range of 2-0.5 mm. Generally the markers 106 (i.e. those comprising locator markers, which are discussed following) have the same depth and length as the markers 96 of the data sequence, but have a width (i.e. a read distance) of 1.5-10 or 3-5 times of said markers 96. In the case of circumferentially arranged markers 96 the distance between the markers 96, 106 may be defined as the maximum, minimum or average circumferential distance.

Data Sequence of Code

The code 94, examples of which are illustrated in FIGS. 4-8, comprises a data sequence 98, which encodes the preparation information. The data sequence 98 consists of a plurality of marker locations, with each marker location selected to either comprise or not comprise a marker 96 as a variable to encode the preparation information. Generally, each marker location encodes a single bit, whereby a marker 96 or the absence thereof encodes either a 0 or a 1. The data sequence 98 may comprise any suitable number of marker locations, such as 8 (as in the example shown in FIG. 4)-12, depending on the storage requirements of the code.

Figure 5:
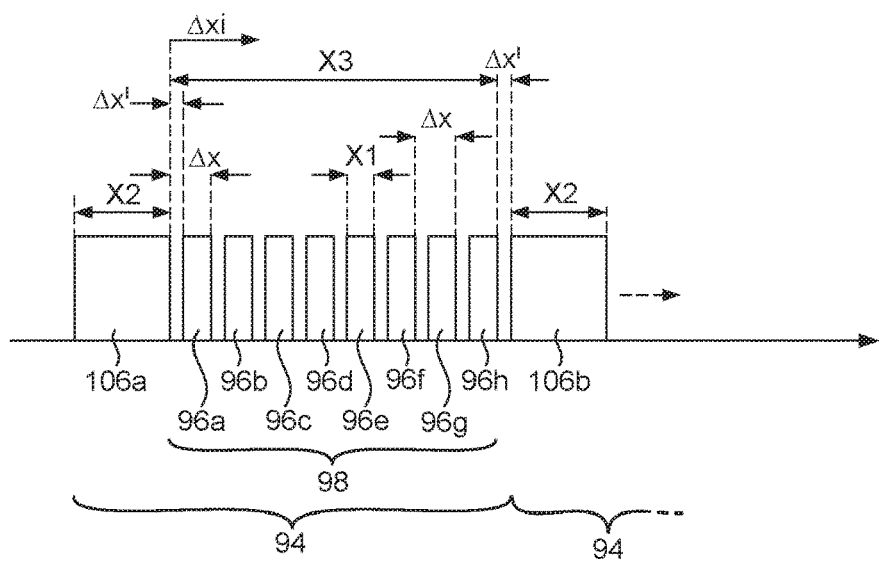

Referring to FIG. 5, which shows the code 94 more conveniently illustrated with a linear arrangement, generally each marker location is separated by the same predetermined distance $\Delta x$ from corresponding positions of adjacent marker locations. The marker location have index i, whereby i varies from 1-n, whereby 1 designates the first marker location and n designates the end marker location of said sequence. Each marker location is spaced a predetermined distance $\Delta x_i$ from a reference position, whereby the corresponding index i applies. Herein the reference position is a locator marker 106 adjacent the first marker location in the data sequence, in particular it is a position of an adjacent edge thereof. In the example illustrated in FIG. 5 the reference position is marker 106a, and the first and last marker locations in the data sequence 98 are at markers 96a and 96h respectively.

The data sequence 98 has an overall length of X2, which is equivalent to $\Delta x_n$, i.e. the distance from the reference position to the last marker location in the in the data sequence (it is also the sum of the $\Delta x$ distances).

Figure 6:
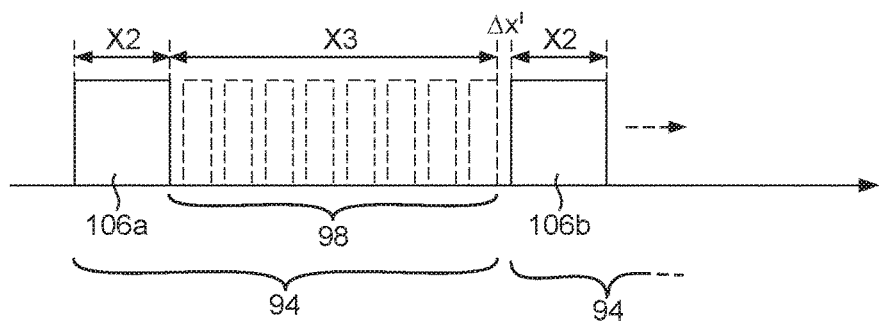

FIGS. 5 and 6 illustrated the data sequence 98 with 8 marker locations, hence a total of 8 bits are encoded: in FIG. 5 each marker location is occupied by markers 96a-96h; in FIG. 6 none of the marker locations comprises a marker. In the instance wherein the presence of a marker 96 at a marker location encodes a 1 and the absence thereof encodes a 0: the byte encoded in FIG. 5 is 11111111, and in FIG. 6 it is 00000000.

The data sequence 98 generally encodes several blocks of different preparation information. For example, 1-j blocks, whereby j comprises a machine 4 specific amount, such as 1, 2, 3, 4 or 5. In the code of FIGS. 5 and 6 j=3 hence there are three blocks: bits 1-3 (markers 96a-96c) relate to a first block; bits 4-6 (markers 96d-96f) relate to a second block; bits 7-8 (markers 96g-96h) relate to a third block.

The data sequence 98 is in general bounded by two locator markers 106a, 106b (e.g. the associated locator marker 106a and a locator marker 106b from a subsequent repetition of the code 94). The data sequence 98 is denoted herein as having length X3, which is defined as the distance between the adjacent edge of the associated locator marker 106 and the corresponding edge of last marker location in the data sequence 98 (or the sum of the $\Delta x$ distances is X3).

The distance $\Delta x$ between marker locations of the data sequence 98 is in general variable between codes 94 on different containers 6 can be calibrated using the read distance X2 of the associated locator marker 106, which will be discussed. However the $\Delta x$ distance may be fixed, with said fixed value stored on the code processing device 56.

Locator Marker of Code

The code 94 of the container 6 comprises one or more locator markers 106, which are uniquely identifiable so the code reads in the encoded preparation information can be conveniently located and/or so the associated data sequence can be conveniently located.

Generally, there is only a single locator marker 106 per data sequence 98. The said locator marker 106 may be arranged at various positions with respect to the data sequence 98, e.g. preceding, proceeding or in the middle thereof. In the illustrated examples the locator marker 106 precedes the data sequence 98. In general there is more than one repetition of the code 94 on the container 6 hence the data sequence 98 is bounded by a locator marker 106 of a subsequent code 94 repetition.

Figure 9:
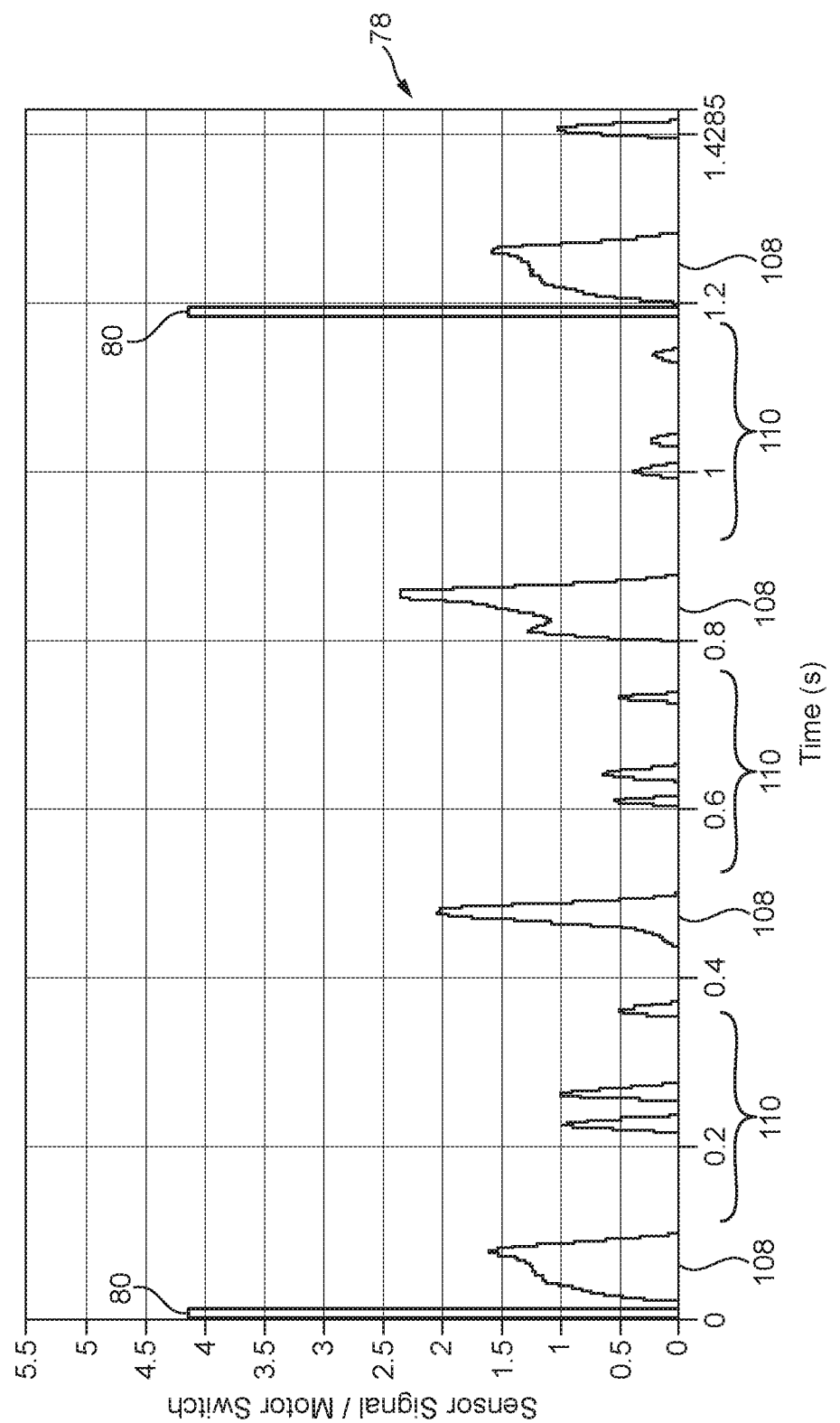
FIGS. 9-10 illustrate encoded preparation information read from the code as it is being processed.

In the example shown in FIG. 9, a first repetition of the code 94 and part of a second repetition 94 of the code is shown, wherein the locator marker 106 has a width X2, which is wider than the width X1 of the markers 96 of the data sequence 98 (referred to as data markers). Generally the width X2 is at least 1.5, 2, 3 or 4 times the width X1 of data markers 96, with a maximum width of about 4, 5, or 6 times that of the data markers 96. The width X2 may also be defined in terms of combinations of the width X1 of the data markers and distance Δx' between adjacent peripheral edges of the marker locations as discussed following.

Calibration Function of Locator Marker

The width X2 of a locator marker 106 may relating to the arrangement of the marker locations of the data sequence 98. Accordingly, the width of the locator marker 106 can be processed to determine the arrangement of the marker locations in the data sequence 98. Advantageously, the implementation of the locator marker 106 in this way enables the data sequence 98 not to be limited to having a particular length X2, i.e. the code 94 can be suitably adapted to fill particular spaces such as a circumferential periphery of the receptacle 6. Moreover, the width of the locator marker 106 can be used for distance correction during processing.

Accordingly, distances Δx between the marker locations of the data sequence 98 may be a function $f$ of X2, hence $\Delta x = f(X2)$. Different functions $f$ can be used to calculate one or more of the distances Δx when the marker locations are spaced apart by varying distances, however generally all of the marker locations are equally spaced, hence a single function is applicable. The function is stored on the code processing device 56.

Since the predetermined distances Δxi of the marker locations of the data sequence 98 from the reference position (e.g. adjacent periphery of the associated locator marker 106) are related to the distances between the marker locations Δx, the predetermined distances Δxi can also be considered to be a function $f$ of X3.

Generally the X2 distance comprises one or more widths of the markers 96 of the marker locations (i.e. the X1 distance), and/or one or more distance Δx', whereby $\Delta x = \Delta x' + X1$ (Δx' is the distance between adjacent peripheral edges of the marker locations, as shown in the FIGS. 5 and 6). The X2 distance may be a multiple of Δx distances, for example, X2 is equal to a multiple of 2, 3 or 4 of Δx distances.

Figure 7:
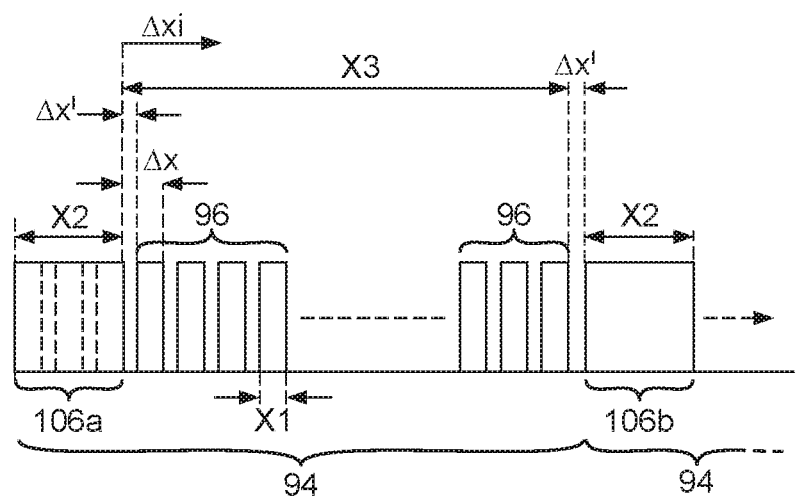

Referring to FIG. 7, the width X2 of the locator marker 106a comprise three X1 distances and two Δx' distances. Hence $X2 = 3X1 + 2\Delta x'$ (i.e. the function is $X2 = 2\Delta x + X1$) and since X1 is a known distance (which in the example is 0.75 mm and is stored on the code processing device 56) Δx' (and thus Δx) can be determined by processing the code read information to measure X2 and applying the inverse of the aforementioned function.

In a further example (not shown) the result of the above functions can be averaged using two or more locator markers 106, e.g. markers 106a and 106b bounding data sequences 98 as shown in FIG. 5.

Specific Example of Code

Figure 8:
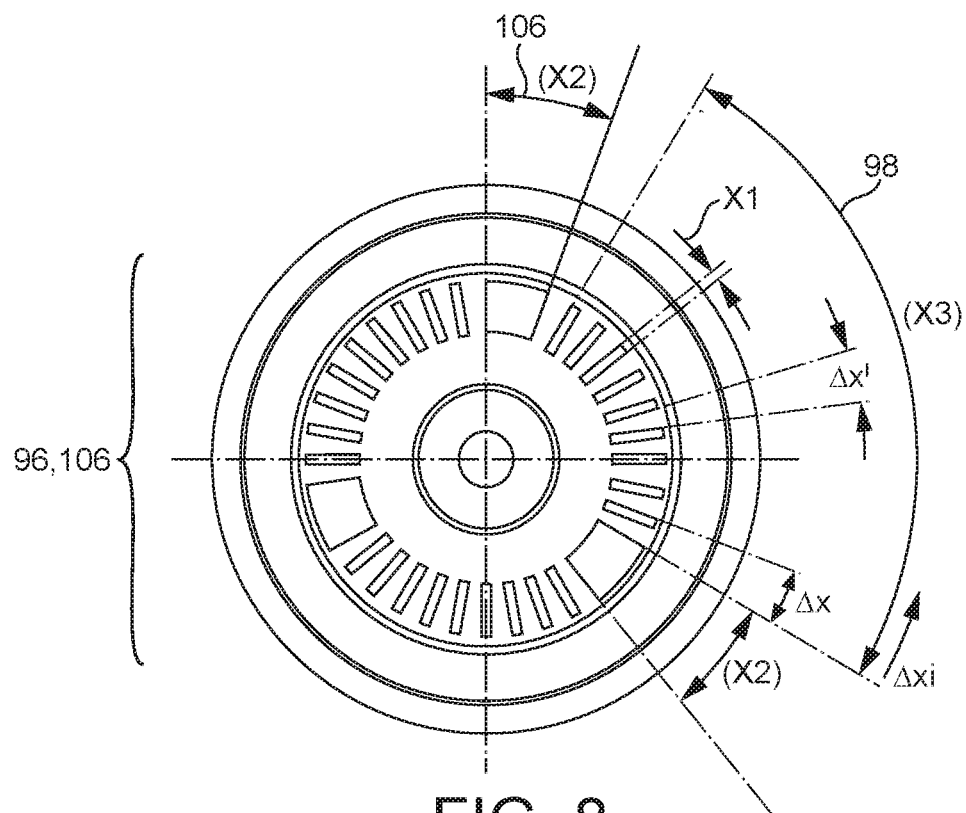

FIG. 8 shows a general example of a container 6 comprising three repetitions of a code 94, which comprises the data sequence 98 and a locator marker 106, whereby the corresponding X1-X3 distances are indicated. The locator markers 106 of a consecutive repetition bounds a data sequence 98 of a previous repetition. The markers 96, 106 of the code 94 each have an inner edge arranged proximate the container axis of rotation at diameter D1, and an outer edge arranged distal the container axis of rotation at diameter D2. With D1 and D2 set to 15.7 mm and 21 mm respectively, the average diameter Day is 18.35 mm. Using Day, the circumferential distance of each code repetition is 19.2 mm. As an example: X1 can be set to 0.75 mm; with $X2 = 3X1 + 2\Delta x'$ and 9 marker locations in the data sequence 98, Δx' is determined by the relation $19.2 = 12X1 + 12\Delta x'$, hence Δx' is 0.85 mm; Δx is 1.6; X2 is therefore determined as 3.95 mm; X3 is therefore determined as 15.28 mm.

Method of Processing Code

Processing of the code 94 to decode the encoded preparation information is now discussed. For a code reading system 18 that comprises a code reading device 54 consisting of an image capturing device, it will be appreciated that the said process is relatively uncomplicated, e.g.: the encoded preparation information is provided as a captured digital image of the code (or codes); using a known feature extraction technique the location of the markers 96, 106 can be determined; the distances X2 and Δx, determined and the marker locations of the data sequence read.

However in a particular (but non-limiting) example, wherein the code reading system 18 comprises a code reading device consisting of an inductive sensor or optical sensor to sequentially read the markers 96 of the code 94, the process is more complex since the encoded preparation information provided to the code processing device 56 by the code reading device 54 generally comprises an analogue signal with pulses to identify the presence (or absence) of a marker. In the following a method for processing for this particular (but non-limiting) example is provided, for which it will be appreciated aspects are applicable to the image capturing method.

For convenience the method is decomposed in into stages: a first information acquisition stage; a second determination of a number code reads in the information stage; a third determination of location of markers in the information stage; a fourth determination locator marker location stage; a fifth determination of X2 distance stage; a sixth error checking stage; a seventh processing of the data sequence stage:

Stage 1: Encoded Preparation Information Acquisition

The encoded preparation information on the codes(s) 74 of the container 6 are read by the code reading device 54 and provided as encoded preparation information to the code processing device 56.

In embodiments that comprise a code reading mechanism, the code processing device 56 may control said mechanism to effect relative motion between the container 6 (e.g. the capsule or receptacle) and code reader for sequential reading of the markers 96 of the codes(s) 94. The code reading mechanism may output the aforesaid read cycle signal to the code processing device 56. The read cycle signal comprises information to determine the number of read cycles contained in an acquired portion of the encoded preparation information, wherein a read cycle is defined as a single complete read of the code(s) 94 on the receptacle 6. In an example wherein the container 6 comprises only a single repetition of the code 94 a read cycle comprises a single code read. In an example wherein the container 6 comprises three repetitions of the code 94 a read cycle comprises three code reads. The read cycle signal 80 may comprise a/or several pulse(s) for a particular number of read cycles. A clock signal (e.g. from a clock generator of the code processing device 56) is generally used to determine the time dependency of the read cycle signal and encoded preparation information (e.g. by recording the preparation information and read cycle signal with a particular sampling frequency).

FIG. 9 shows graphically an example of the read cycle 80 signal an pulsed signal comprising encoded preparation information 78 when plotted against time (e.g. from the clock signal). In FIG. 9 the read cycle signal 80 comprises a pulse upon initiation of reading (i.e. at a time of zero) and 2 pulses for every one read cycle thereafter.

The said signals/information are stored, typically as digital data, on the code processing device and referred to hereon generally as the encoded preparation information.

Stage 2: Determination of a Number Code Reads in the Information

The number of code reads in the encoded preparation information is determined generally to ensure there are sufficient code reads to enable satisfactory decoding of the preparation information. If the number of code reads is above/or a predetermined amount, such as 1-10 said reads are processed, else the code processing device 56 may effect further reading of the code(s) 94 to obtain more code reads or optionally terminate processing. The number of code reads in the encoded preparation information may be determined by various means. In one example the number of code reads is determined using information from the read cycle signal, and can be achieved by determining the number of read cycles from the number of pulses in said information. The location of a pulse (shown in FIG. 9) can be determined by calling the pulse locating routine as discussed following. Since a read cycle comprises a known number of code reads, the total number of code reads is calculated by the product of the read cycles and code reads per read cycle. Alternatively, the number of code reads in the preparation information is determined by counting therein the number of locator markers.

Stage 3: Determination of Location of Markers in Information

The location of the markers in the encoded preparation information is determined.

Initially the pulses in the encoded preparation information are identified generally by a characteristic feature thereof, e.g, the peak or the rise or fall of the signal at particular amplitude, each of which may be located via a derivative or otherwise. Determination using a peak is advantageous when processing pulses that are particularly sharp and also for locating the centre of the pulse. Determination using the rise or fall of the signal at particular amplitude (e.g. example 20%) is useful when processing pulses that have a plurality of crests. For said processing the code processing device 56 may comprise a known routine, which may implement regression, such as non-linear or non-parametric regression.

Figure 10:
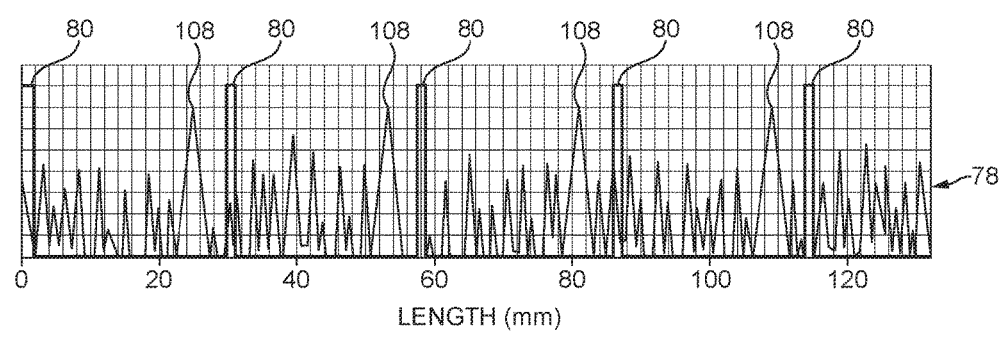

The location of the pulses may be defined in terms of time (as shown in FIG. 9). Said time can then be converted to a distance (as shown in FIG. 10) using the read cycle information, particularly as the read cycle information comprises a pulse for a known distance.

With the distances between the pulses known, i.e. the distance between the markers, which it is referred to hereon as, the encoded preparation information is further processed to locate the code reads therein.

Stage 4: Determination of Locator Marker Locations

The locator markers in the encoded preparation information are determined to identify the locations of the individual code reads in said information. The following stages can be applied to a sequentially read code as in the aforesaid stages or for a code read by a code reading device 54 that comprises a image capturing device.

For the sequentially read code, as an extension of the previous stage, to identify the locator markers the pulses in the encoded preparation information relating to said markers can be identified by means of a characteristic feature thereof, e.g. in FIGS. 9 and 10 the pulses 108 associated with the locator markers are identifiable by their width and/or height etc.

Alternatively, when an image of the code is provided as the encoded preparation information the code processing device can locate the locator markers by means of feature extraction etc.

Stage 5: Determination of X2 Distance

With the location of the locator markers determined the width of the locator markers, i.e. the X2 distance is determined. In this way the arrangement of the marker locations in the data sequence 98 can be determined.

For the sequentially read code the aforementioned pulses can be processed to determine the pulse width, which is a measure of the X2 distance. In particular the X2 distance may be defined as the pulse width at various points of the pulse e.g.: the foot of the pulse (i.e. between the initiation of rise from a baseline value and the return of the signal to the base line value); at a particular amplitude for example 50% or 20%; the peak gradient. Optionally the X2 distances of one or more associated pulses may be averaged, for example, the calibration distance of locator markers 106 that border the data sequence 98 or those arranged subsequent to each other (i.e. in an embodiment that comprises either of these arrangements).

Alternatively, when an image of the code is provided as the encoded preparation information the code processing device can determine from the identified locator markers the X2 distance by means of feature extraction etc.

As part of this stage a reference position can be determined, which herein is a locator marker 106 adjacent the first marker location in the data sequence, in particular it is a position of an adjacent edge thereof.

In an example of the code that comprises a distance $\Delta x$ between the marker locations of the data sequence which is fixed this stage can be omitted (excluding the determination of the reference position), whereby the said $\Delta x$ distance is stored on the code processing device.

Stage 6: Error Checking of Code Reads

Optionally the individual code reads are checked for errors, which can comprise checking the sequences of the code reads and/or comparing code reads. Errors in the code reads may be due to various reasons e.g.: variations in the reading velocity; markers failing to be identified; damage to a container 6. If an error is determined then typically the associated code read is discarded from the encoded preparation information.

In one example a length of a portion of a code read or an entire code read may be checked. For example, the length may be that of: X2; X1; X2+X3; the distance between adjacent locator markers. If said length is above and/or below a predetermined amount then an error may be determined. In a particular (but non-limiting) example the X2+X3 length is checked. In the specific example that is shown in FIG. 8, X2 is 12.8 mm and X3 is 2.8 mm: the sum of X2 and X3 is therefore 15.6. A suitable first and second predetermined amount can be chosen as 14 mm and 17 mm respectively.

In a further example the number of pulses relating to markers 96 and/or 106 in one of or the sum of a plurality of sequences of a code read may be checked: if above or below a predetermined amount then an error may be determined.

Stage 7: Processing of Data Sequence

For each code read the marker locations of the data sequence 98 are read and the encoded preparation information decoded. In doing so the $\Delta x$ distance is generally determined from the relationship $\Delta x = f(X2)$ (unless $\Delta x$ is a stored fixed amount), and used to determine whether a marker is present at each marker location.

The code processing device 56 can be idealised as generating a data array with dimension n, i.e. an element of the array for each marker location with an element for each marker location. To assign the array, for each element, it is determined whether the associated marker location has a corresponding marker: if present then a first value may be assigned, else (i.e. no marker is present) a second value may be assigned. Typically the first and second values are binary, hence the first value can be set to 1 and the second value can be set to 0 (or the converse).

As an example of assignment of a data array: referring to FIG. 5, there are 8 marker locations (indexed from markers 96*a*-96*h*) from the reference position (the adjacent edge of marker 106*a*), hence the data sequence encodes 8 bits and the array has dimension 8. Since there is a marker at each marker location each element of the array has a value of 1, or rather a byte of the array is 11111111. In the example shown in FIG. 6, no markers are present, hence the corresponding byte of the array is 00000000.

In one example the marker locations may be read by determining, for each marker of the data sequence, the distance from the reference position (the adjacent edge of marker 106*a*). Said distances are divided by the determined $\Delta x$ distance and a floor and/or ceiling function applied to the result to convert to the nearest integer that corresponds to an element of the array. This element may then be assigned the first value i.e. 1. The default value assigned to the array may be the second value i.e. 0, hence when there is no marker the second value is assumed.

Alternatively the marker locations may be read by determining each of the predetermined distances $\Delta x_i$ of the marker locations in the data sequence 98 from the reference position (the adjacent edge of marker 106*a*). These can be calculated by the product of $\Delta x$ and i (i.e. $\Delta x_i = i \Delta x$), wherein i varies from 1 to n (the number of marker locations of the data sequence). Proximate the location of these calculated predetermined distances $\Delta x_i$, the presence of a marker can be determined: if present then the relevant element of the array may be assigned the first value i.e. 1, else no value is assigned, and the default value may be the second value, i.e. 0.

The elements of the array may be summed to determine a byte (e.g. 8 bits or another word length): for example, in FIG. 5 the byte is 11111111; in FIG. 6 the byte is 00000000. The bytes for each code read may be checked for errors. An example is by checking if a predetermined number of bytes are identical, whereby said predetermined number may be 50, 60 or 70% of the total number of stored bytes or an actual number of bytes, for example 2, 4 or 10. In the event sufficient bytes are identical than one of the values of the identical bytes can be assigned as a checked byte. Another example is the encoding of a parity check bit.

The byte can be decoded to determine the preparation information, e.g. by means of a lookup table. The byte may also be processed as the aforesaid individual blocks, with a lookup table applied to each. The decoded preparation information may be output by the output device 58, e.g. for use by the preparation program 48 of the processor 38 during a preparation operation.

Machine and Container Attachments

Figure 11:
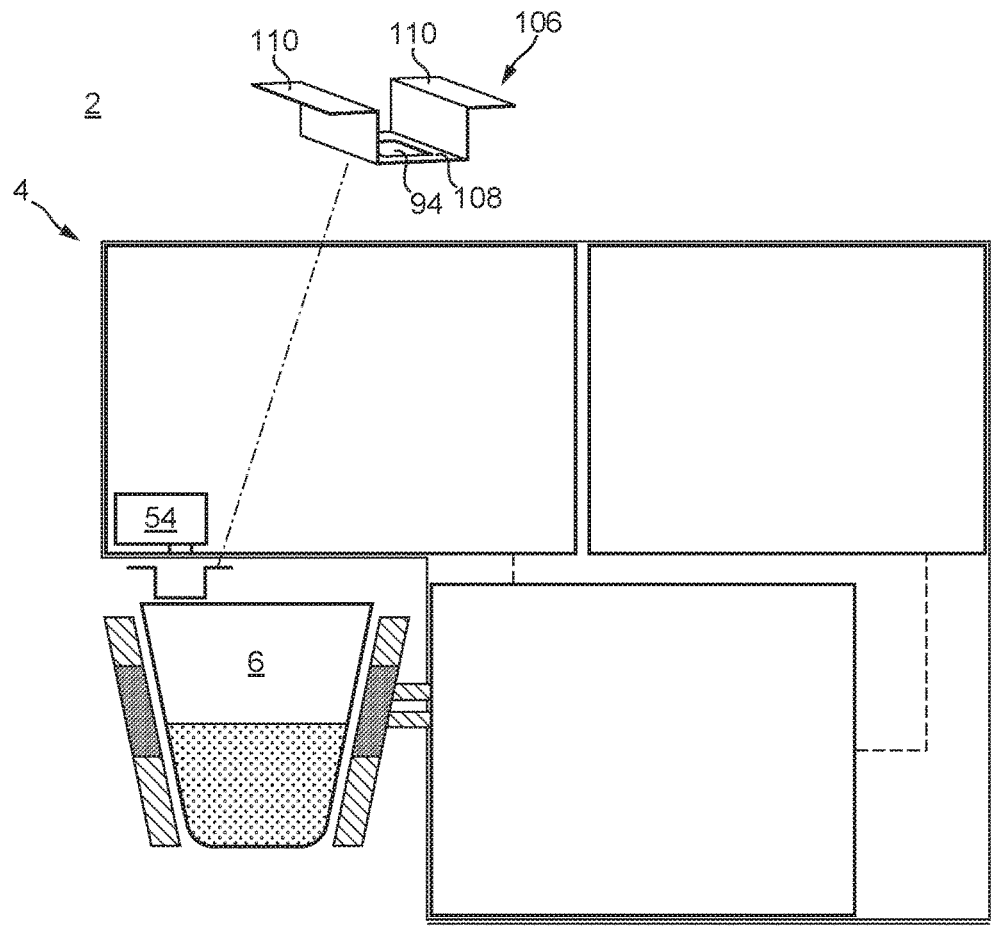
FIG. 11-12 show embodiment attachments comprising a code for the system of FIG. 1.

An attachment 106 may comprise the afore-described code 94 arranged on a surface thereof, the attachment 106 is configured for attachment to the afore-described beverage or foodstuff preparation machine 4. The attachment, an example which is illustrated in FIG. 11, comprises: a carrier 108 for carrying the code 94; an attachment member 110 for attachment of the carrier 108 to the machine 4 between an code reading device 54 of said machine 4 and a container 6 received by said machine 4 and proximate said container. In this way the code 94 can be read by the code processing device 54 as if it were attached to the container 6. Examples of suitable attachment members comprise: extensions attached to said carrier comprising an adhesive strip (as illustrated); a mechanical fastener such as a clip, bolt or bracket.

Figure 12:
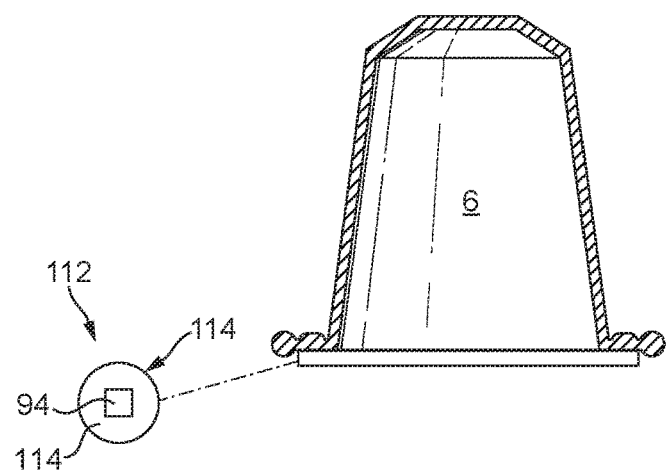

An alternate attachment 112 may comprise the afore-described code 94, arranged on a surface thereof, the attachment 112 configured for attachment to the afore-described container 6. The attachment 112, an example which is illustrated in FIG. 12, comprises: a carrier 114 for carrying of the code 94; an attachment member for attachment of the carrier 114 to the container 6. In this way the code 94 can be read by the code reading device 54 as if it were formed integrally on the container 6. Examples of suitable attachment members comprise: an adhesive strip (as illustrated); a mechanical fastener such as a clip, bolt or bracket.

LIST OF REFERENCES

2 Preparation system
    4 Preparation machine
        10 Housing
            20 Base
            22 Body
        14 Preparation unit
            12 Fluid supply
                24 Reservoir
                26 Fluid pump
                28 fluid thermal exchanger
        Embodiment 1
        30 Extraction unit
            32 Injection head
            34 Capsule holder
            50 Capsule holder loading system
            52A Insertion channel
            52B ejection channel
        Embodiment 2
        74 Mixing unit
            76 Preparation material container
            78 Dispensing unit
    16 Control system
        36 User interface
        38 Processor
            46 Memory unit
                48 Preparation program -continued

LIST OF REFERENCES

40 Sensors (temperature, receptacle level, flow rate, torque, velocity)
    42 Power supply
    44 Communication interface
  18 Code processing system
    54 Code reading device
    56 Code processing device
    72 Output device
6 Container
  Capsule/Receptacle
    58 Body portion
    60 Lid portion
    62 Flange portion
  Packet
    64 Sheet material
    66 Internal volume
    68 Inlet
    70 Outlet
      94 Code
        96 Markers
          98 Data sequence
          106 Locator marker

The invention claimed is:

1. A container for a foodstuff or beverage preparation machine, the container for containing beverage or foodstuff preparation material and comprising a code encoding preparation information, the code comprising:
    a data sequence having a plurality of marker locations, whereby said marker locations either comprise or do not comprise a marker as a variable to at least partially encode the preparation information therein, with adjacent marker locations separated by a distance of $\Delta x$; and
    at least one locator marker to enable location of the data sequence of the code, the locator marker having a read distance X2, which is distinct from a read distance X1 of the data markers to enable a locator marker to be identified, and wherein the read distance X2 of the at least one locator marker is related to the distance(s) $\Delta x$ between the plurality of marker locations of the data sequence, such that the X2 distance determines the arrangement of the marker locations.

2. The container according to claim 1, wherein X2=$f(\Delta x)$, wherein $f$ comprises a multiple of the $\Delta x$ distances, or the summation of a multiple of X1 distances and a multiple of $\Delta x'$ distances, whereby $\Delta x=\Delta x'+X1$, and $\Delta x'$ is the gap between the marker locations.

3. The container according to claim 1, wherein the markers of the data sequence and locator markers comprise are rectangular, whereby the markers of the data sequence comprise one or more of the following dimensions: a length of 5 mm-1.5 mm and a width of 2 mm-0.3 mm.

4. The container according to claim 1, wherein adjacent marker locations of the data sequence are equally spaced such that $\Delta x$ is a fixed amount, and adjacent marker locations are at least 20% of a width of a marker location apart.

5. The container according to claim 1, wherein the markers of the code are arranged sequentially to each other and radially aligned on a single circumferentially extending line, which extends about an axis of rotation of the container or other rotational axis on a surface thereof.

6. The container according to claim 1, wherein the markers of the code are formed by electrically conductive portions.

7. The container according to claim 1, wherein the code is formed on a surface of the container or on an attachment, which is attached thereto.

8. The container according to claim 1, wherein the container comprises at least one of the following:
    a capsule;
    a packet; and
    a receptacle for consumption of the beverage or foodstuff therefrom.

9. A beverage or foodstuff preparation machine, said preparation machine comprising:
    a preparation unit to receive a container according to claim 1 and to prepare a beverage or foodstuff therefrom;
    a code processing system operable to read a code of said container to obtain encoded preparation information and process the encoded preparation information to decode said information; and
    a control system operable to control the preparation unit using said decoded preparation information.

10. The beverage preparation machine according to claim 9, wherein the code processing system is configured to process the encoded preparation information to locate one or more code reads therein by locating a locator marker that has a characteristic read distance X2, which is distinct from the read distance X1 of the markers of the data sequence, and is further configured to:
    locate from said locator marker and associated data sequence; and
    determine the presence of a marker at each marker location of the data sequence.

11. An attachment configured for attachment to a beverage or foodstuff preparation machine according to claim 9, the attachment comprising:
    a carrier carrying on a surface thereof a code comprising:
        a data sequence having a plurality of marker locations, whereby said marker locations either comprise or do not comprise a marker as a variable to at least partially encode the preparation information therein, with adjacent marker locations separated by a distance of $\Delta x$; and
        at least one locator marker to enable location of the data sequence of the code, the locator marker having a read distance X2, which is distinct from a read distance X1 of the data markers to enable a locator marker to be identified; and
    an attachment member for attachment to said machine.

12. A method of preparing a beverage or foodstuff, comprising:

attaching the attachment of claim 11 to a beverage or foodstuff preparation machine, wherein the beverage or foodstuff preparation machine comprises a preparation unit, a code processing system, and a control system;

inserting a container in the preparation unit of the beverage or foodstuff preparation machine, wherein the preparation unit receives the container to prepare a beverage or foodstuff therefrom, wherein the code processing system of the beverage or foodstuff preparation machine operates to read the code of the attachment to obtain encoded preparation information and processes the encoded preparation information to decode the information, and wherein the control system of the beverage or foodstuff preparation machine operates to control the preparation unit using the decoded preparation information.

13. A beverage or foodstuff preparation system comprising:

a container according to claim 1; and a beverage or foodstuff preparation machine comprising:

a preparation unit to receive the container and to prepare a beverage or foodstuff therefrom;

a code processing system operable to read a code of the container to obtain encoded preparation information and process the encoded preparation information to decode the information; and a control system operable to control the preparation unit using the decoded preparation information.

14. A method of preparing a beverage or foodstuff using the system according to claim 13, the method comprising:

reading a code of a container to obtain encoded preparation information;

processing the encoded preparation information to decode said information; and controlling a preparation operation using said preparation information.

15. An attachment configured for attachment to the container of according to claim 1, the attachment comprising:

a carrier carrying on a surface thereof code encoding preparation information; and an attachment member for attachment to said container.

16. A method of preparing a beverage or foodstuff, comprising:

inserting the container of claim 1 in a beverage or foodstuff preparation machine, wherein the beverage or foodstuff preparation machine comprises a preparation unit to receive the container and to prepare a beverage or foodstuff therefrom, wherein a code processing system of the beverage or foodstuff preparation machine operates to read a code of the container to obtain encoded preparation information and processes the encoded preparation information to decode the information, and wherein a control system of the beverage or foodstuff preparation machine operates to control the preparation unit using the decoded preparation information.

17. A computer program for a processor of a code processing system of a beverage or foodstuff preparation machine, wherein the beverage or foodstuff preparation machine comprises a preparation unit to receive the container and to prepare a beverage or foodstuff therefrom, a code processing system operable to read a code of the container to obtain encoded preparation information and process the encoded preparation information to decode the information, and a control system operable to control the preparation unit using the decoded preparation information, the computer program comprising program code to:

obtain encoded preparation information of a code of a container according to claim 1; and process the encoded preparation information to decode said information.

18. A non-transitory computer readable medium comprising the computer program according to claim 17.

* * * * *